June 19, 1928.  1,674,121

J. G. OWENS

COMBINATION BRAKE AND GAS CONTROL

Filed Aug. 14, 1926

Inventor:
Jefferson G. Owens
By Monroe E. Miller
Attorney

Patented June 19, 1928.

1,674,121

UNITED STATES PATENT OFFICE.

JEFFERSON GRANT OWENS, OF SWAMPSCOTT, MASSACHUSETTS.

COMBINATION BRAKE AND GAS CONTROL.

Application filed August 14, 1926. Serial No. 129,275.

The present invention relates to the controlling devices of motor vehicles, and aims to provide a combination brake and gas control whereby the brakes and the gas may both be controlled by a single control member.

Another object of the invention is the provision of a combination brake and gas control which will cut off the gas supply to the engine when the brakes are applied and which will release the brakes when the control is operated to accelerate the flow of gas to the engine.

A further object is the provision of novel means for operating the gas control from the foot pedal or lever which controls the brakes, in order that both the brakes and gas may be controlled from such pedal or lever.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
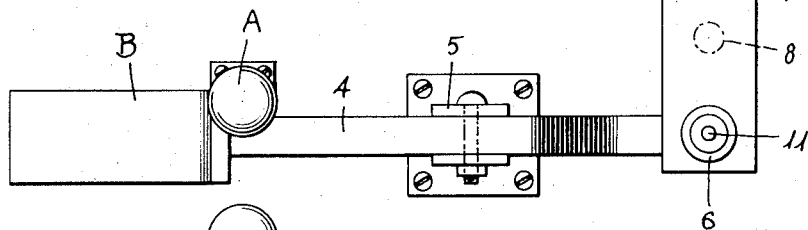
Figure 1 is a plan view of the improved combination brake and gas control.

The usual foot pedal or lever B controls the brakes in the well known manner, being depressed or pushed forwardly and downwardly for applying the brakes, while the flow of gas to the engine is controlled by means of a plunger rod 8. Said rod 8 is pushed downwardly for accelerating the flow of gas to the engine in the usual manner.

In carrying out the invention the gas control rod or member 8 is controlled from the foot pedal B, and for this purpose a piece 1 is secured to the pedal and is connected by a link 2 with one arm of a lever 4 which is fulcrumed between its ends, as at 5, on the foot board, between the pedal B and gas control rod 8. A lever 7 extends across and bears on the rod 8, and is fulcrumed at its forward end, as at 9, on the foot board. The arm of the lever 4 opposite to the link 2 extends under the lever 7, and a rod 11 is pivotally connected with said arm of the lever and extends upwardly loosely through an aperture in the lever 7, a nut 6 being screw-threaded on the rod 11 and bearing on the lever 7. The nut 6 as well as the link 2 may be adjusted.

A catch A is fulcrumed, as at 12, on the foot board at one side of the brake pedal B and has a notch 13 to engage said pedal and hold it with the brakes applied, such as when parking the machine.

Figure 2:
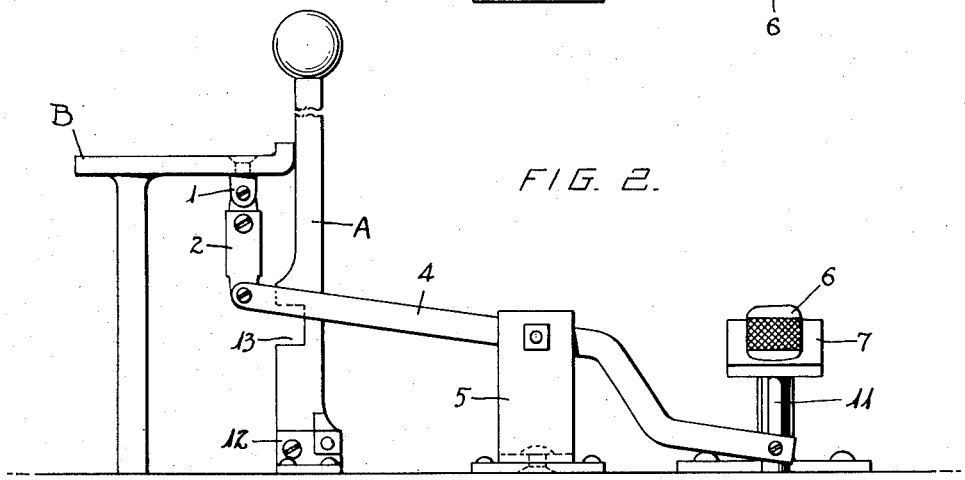
Fig. 2 is a rear view thereof.
Figure 3:
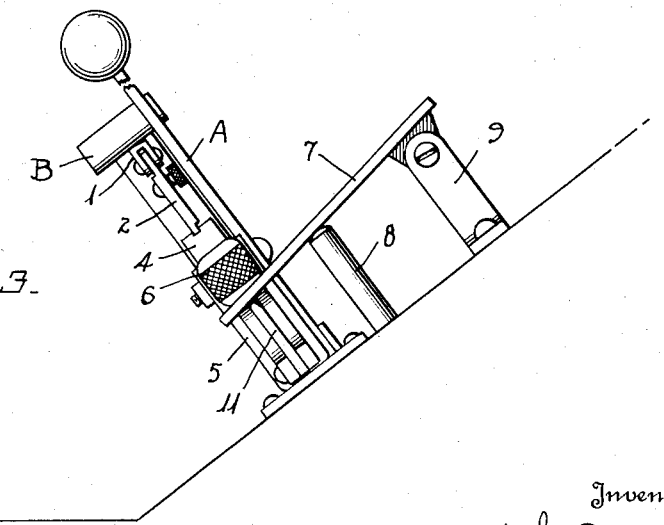
Fig. 3 is a side elevation of the mechanism.

In the position of the parts shown in Figs. 1, 2 and 3, the brakes are released and the brake pedal being raised will, through the link 2, swing the lever 4 so as to depress the lever 7, the nut 6 being moved downwardly. The lever 7 being swung downwardly will depress the gas control rod 8 so as to open the throttle valve. By proper adjustment of the link 2 and nut 6, this will limit the amount to which the throttle valve may be opened, so as to restrict the speed of the automobile. However, the lever 7 may be depressed to further accelerate the speed, if required, but with the normal control of the gas from the brake pedal, the acceleration in speed is restricted. By pushing down on the brake pedal through part of its downward movement, the lever 4 is swung so as to raise the rod 11 and nut 6, thereby permitting the gas control rod 8 to move upwardly by the usual spring means (not shown), and the gas is thereby shut off when the brake pedal has reached an intermediate position. Then, by moving the pedal down further the brakes are applied after the gas is shut off, the rod 11 being free to move upwardly through the lever 7 after the lever 7 and rod 8 have been restored to initial position for the idling of the engine. Thus, when the brake pedal is pushed down the gas is first shut off and the brakes then applied, which is a safety measure, and the mere application of the brakes will first cut off the flow of gas to the engine, so that in an emergency the operator cannot become confused. When the car is to be parked the catch A may be engaged with the brake pedal to hold the pedal with the brakes applied.

When the brake pedal is relieved from its depressed position, the brakes are first released, and then after the pedal has moved upwardly beyond a neutral intermediate position the further upward movement of the pedal will result in the nut 6 depressing the lever 7 and accelerating the flow of gas to the engine. The control of the throttle valve is thus obtained from the brake pedal and by relieving the pressure on the brake pedal the flow of gas is accelerated while pressure on the brake pedal will decelerate the flow of gas. In this way the control of the foot brakes and gas are coordinated, and the device has the advantage that when it is desired to travel at maximum permitted speed, no pressure on the brake pedal or gas control is necessary, inasmuch as the brake pedal being fully relieved will move the gas control to the full adjusted amount, thereby relieving the operator, but pressure on the brake pedal will immediately decrease the flow of gas to the engine and if continued will apply the brakes.

Having thus described the invention, what is claimed as new is:—

1. A combination brake and gas control comprising a brake applying member, a gas control member, and an operative connection between said members for operating the gas control member to accelerate the gas supply when the brake applying member completes its releasing movement.

2. A combination brake and gas control comprising a brake pedal, a gas control member, and means controlling the gas control member and controlled from the brake pedal for decelerating and accelerating the gas supply when the brake pedal is pushed and released, respectively.

3. A combination brake and gas control comprising a brake pedal, a depressible gas control member, and a lever operably connected with said pedal and member for depressing said member when the pedal completes its releasing movement and for releasing said member when the pedal is pushed to apply the brakes.

In testimony whereof I hereunto affix my signature.

JEFFERSON GRANT OWENS.